(12) United States Patent
Anderson et al.

(10) Patent No.: US 11,941,143 B2
(45) Date of Patent: Mar. 26, 2024

(54) CLOUD-BASED WHITEBOX NODE LOCKING

(71) Applicant: ARRIS Enterprises LLC, Suwanee, GA (US)

(72) Inventors: Lex Aaron Anderson, Auckland (NZ); Rafie Shamsaasef, San Diego, CA (US); Alexander Medvinsky, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 18/171,081

(22) Filed: Feb. 17, 2023

(65) Prior Publication Data

US 2023/0195925 A1 Jun. 22, 2023

Related U.S. Application Data

(63) Continuation of application No. 17/722,201, filed on Apr. 15, 2022, now Pat. No. 11,625,498.

(60) Provisional application No. 63/181,670, filed on Apr. 29, 2021.

(51) Int. Cl.
| | |
|---|---|
| G06F 21/62 | (2013.01) |
| G06F 21/44 | (2013.01) |
| G06F 21/60 | (2013.01) |
| H04L 9/08 | (2006.01) |

(52) U.S. Cl.
CPC .......... *G06F 21/6227* (2013.01); *G06F 21/44* (2013.01); *G06F 21/602* (2013.01); *H04L 9/085* (2013.01); *H04L 2209/16* (2013.01); *H04L 2209/34* (2013.01)

(58) Field of Classification Search
CPC .... G06F 21/6227; G06F 21/44; G06F 21/602; G06F 21/14; H04L 9/085; H04L 2209/16; H04L 2209/34; H04L 9/002; H04L 9/0618
See application file for complete search history.

(56) References Cited

U.S. PATENT DOCUMENTS

| | | | |
|---|---|---|---|
| 11,487,715 B1 * | 11/2022 | Karr | G06F 3/0655 |
| 2015/0372989 A1 * | 12/2015 | Michiels | H04L 9/0631 |
| | | | 713/168 |
| 2016/0211970 A1 * | 7/2016 | Park | H04L 9/002 |
| 2018/0083933 A1 * | 3/2018 | Mullen | G06F 21/10 |
| 2018/0165454 A1 * | 6/2018 | Anderson | G06F 21/125 |
| 2018/0167197 A1 * | 6/2018 | Anderson | H04L 9/002 |
| 2018/0198613 A1 * | 7/2018 | Anderson | G06F 21/602 |

(Continued)

FOREIGN PATENT DOCUMENTS

| | | |
|---|---|---|
| EP | 2960891 A1 | 12/2015 |
| EP | 3608806 A1 | 2/2020 |

OTHER PUBLICATIONS

International Search Report and Written Opinion RE: Application No. PCT/US22/25112, dated Jul. 6, 2022.

*Primary Examiner* — J. Brant Murphy
(74) *Attorney, Agent, or Firm* — Chernoff, Vilhauer, McClung & Stenzel, LLP

(57) ABSTRACT

A secure cloud-based node-locking service with built-in attack detection to eliminate fuzzing, cloning and other attacks is disclosed. White-box base files are securely stored on the cloud service and are not vulnerable to accidental leakage. A secure cloud-based dynamic secret encoding service reduces the risk of exposure of unprotected secrets and other sensitive data.

21 Claims, 16 Drawing Sheets

(56) References Cited

U.S. PATENT DOCUMENTS

2020/0007342 A1\* 1/2020 Liem ..................... H04L 9/0637
2020/0328876 A1\* 10/2020 Gouget ................ H04L 9/0618

\* cited by examiner

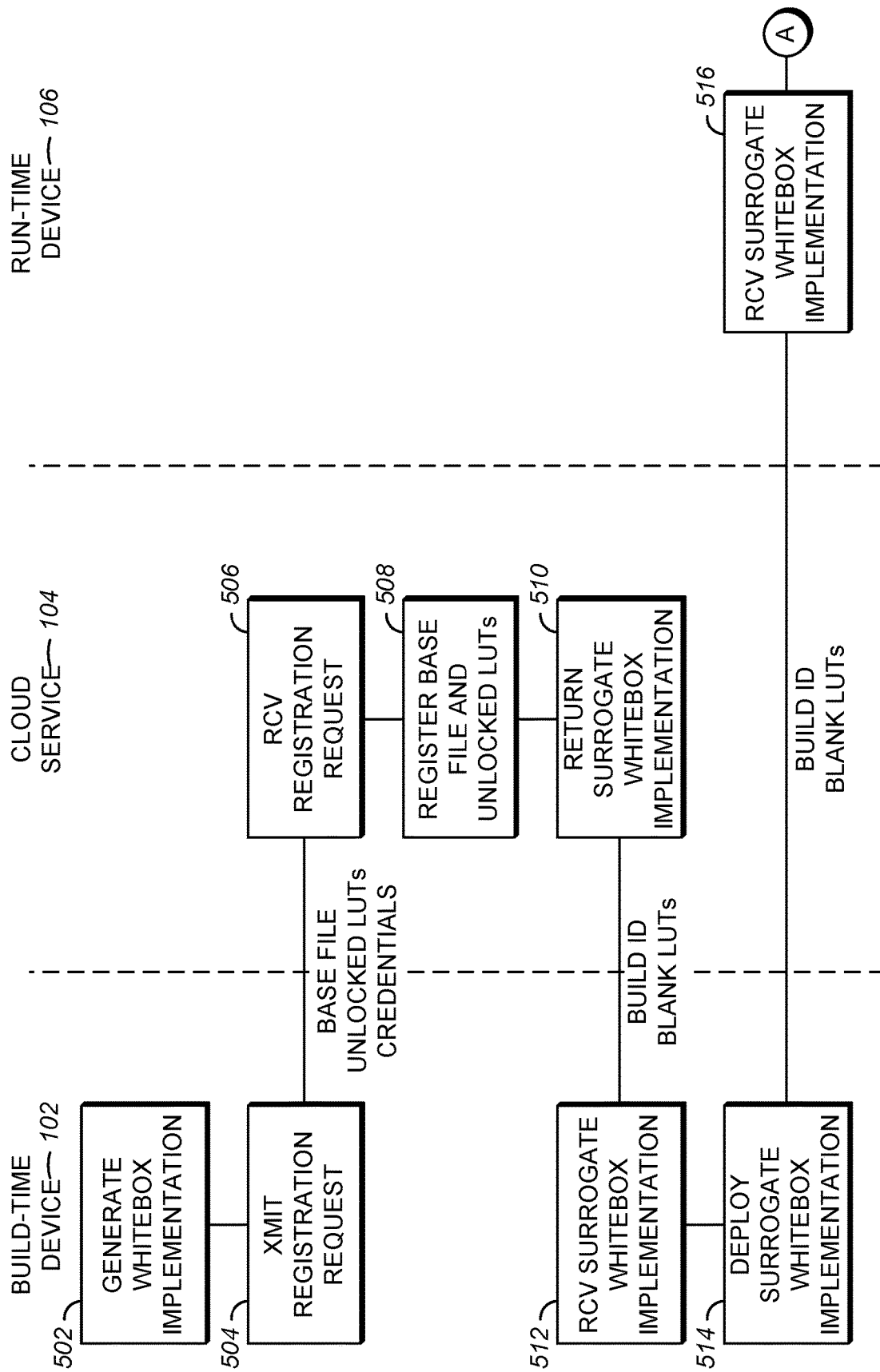

ALGORITHM 1 UNIFORM PPT STATIC WHITE-BOX NODE-LOCKING ALGORITHM WITHOUT APPLICATION BINDING.
REQUIRE: $\{T_1, ..., T_n\}, m, n$

1: $\pi_{n+1} \leftarrow e$     SET OUTPUT NODE-ENCODING TO IDENTITY PERMUTATION — 802
2: FOR EACH $n \geq j \geq 1$ DO
3:    $C_j \leftarrow N$    GET AN ARBITRARY CONFIGURATION SAMPLE — 804
4:    IF $j = 1$ THEN
5:      $\mu_1 \leftarrow e$    SET TO IDENTITY PERMUTATION — 806
6:    ELSE
7:      $\mu_1 \leftarrow S_T$    GET RANDOM PERMUTATION — 808
8:    END IF
9:    $\sigma_j \leftarrow \Sigma$    SELECT A RANDOM $\sigma_j \in \Sigma$ — 810
10:    $\pi_j^{-1} \leftarrow \mu_j \circ \sigma_j(c_j)$    COMPUTE $\pi_j$ BY COMPOSITION — 812
11:    FOR EACH $1 \leq i \leq m$ DO
12:      $[T_j^i]_j = \pi_{j+1}([T_j]\mu_j(i))$    APPLY $\mu_j$ AND $\pi_{j+1}$ TO $T_j$ — 814
13:    END FOR
14: END FOR
15: RETURN $\{T_1^i, ..., T_n^i\}, \{\sigma_1, ..., \sigma_n\}, C = \{c_1, ..., c_n\}, \pi_1, \pi_{n+1}^{-1}$

*FIG. 8A-1*

ALGORITHM 2 UNIFORM PPT DYNAMIC WHITE-BOX NODE-LOCKING ALGORITHM WITHOUT APPLICATION BINDING.
REQUIRE: $\{T_1,...,T_n\}$, $m$, $n$

1: $\pi_{n+1} \leftarrow e$ — SET OUTPUT NODE-ENCODING TO IDENTITY PERMUTATION — 852
2: FOR EACH $n \geq j \geq 1$ DO
3:    $\lambda_j \leftarrow S_T$ — GENERATE RANDOM SECRET NODE-ENCODING — 853
4:    $c_j \leftarrow N$ — GET AN ARBITRARY CONFIGURATION SAMPLE — 854
5:    IF $j = 1$ THEN
6:      $\mu_j \leftarrow e$ — SET TO IDENTITY PERMUTATION — 856
7:    ELSE
8:      $\mu_j \leftarrow S_T$ — GET RANDOM PERMUTATION — 858
9:    END IF
10:   $\sigma_j \leftarrow \Sigma$ — SELECT A RANDOM $\sigma_j \in \Sigma$ — 860
11:   $\pi_j^{-1} \leftarrow \mu_j \circ \sigma_j(c_j)$ — COMPUTE $\pi_j$ BY COMPOSITION — 862
12:   FOR EACH $1 \leq h \leq m$ DO
13:     FOR EACH $1 \leq i \leq m$ DO
14:       $[T_j^i]_{h,i} := \pi_{j+1}([T_j] \mu_j(h), \lambda_j^{-1}(i))$ — APPLY $\mu_j$ AND $\pi_{j+1}$ TO $T_j$ — 864
15:     END FOR
16:   END FOR
17: END FOR
18: RETURN $\{T_1^i,...,T_n^i\}$, $\{\sigma_1,...,\sigma_n\}$, $\pi_1$, $\pi_{n+1}^{-1}$, $C = \{c_1,...,c_n\}$
      $\lambda = \{\lambda_1,..., \lambda_n\}$

*FIG. 8B-1*

CLOUD-BASED WHITEBOX NODE LOCKING

CROSS-REFERENCE TO RELATED APPLICATIONS

The present application is a continuation of U.S. patent application Ser. No. 17/722,201 filed on Apr. 15, 2022, which claims priority to U.S. Provisional App. No. 63/181,670 filed Apr. 29, 2021, the contents of which are each incorporated herein by reference in their entirety.

BACKGROUND OF THE INVENTION

1. Field of the Invention

The present invention relates to systems and methods for receiving and processing data, and in particular to a system and method for enabling devices to securely process received data.

2. Description of the Related Art

The core idea of white-box cryptography is to mathematically alter a program so that the program directly operates on encrypted and encoded secrets without these ever being present in cleartext form. Since these secrets are never present in cleartext form, the attacker can have complete visibility and control of the application and still not be able to make use of or gain any value from them.

White-box node-locking restricts the operation of a white-box implementation to a specific node to mitigate code-lifting attacks, which is where the implementation is moved from an authorized node to an unauthorized one. However, conventional node-locking does not eliminate all possible attacks. For example, node locking carried out on insecure nodes is vulnerable to cloning, fuzzing and other attacks such as side-channel attacks, tampering and reverse-engineering. Further, white-box base-files (private keys) may be inadvertently leaked from the build environment, allowing an attacker to circumvent the white-box protection altogether. Also, secret encoding for specific node-locked nodes requires additional server infrastructure that developers may not be able to implement securely.

SUMMARY OF THE INVENTION

To address the requirements described above, the present invention discloses a method and apparatus for enabling secure generation of an output in a run-time device. In one embodiment, the method comprises receiving a request to register a whitebox implementation for generating the output in a cloud service from a build-time device, the request comprising a base file and a list of unlocked whitebox look up tables (LUTs); registering the base file and the list of unlocked whitebox LUTs in the cloud service; returning a surrogate whitebox implementation having a build identifier (ID) and a plurality of blank LUTs to the build-time device; receiving lock request from the run-time device upon execution of the surrogate whitebox implementation, the lock request comprising a fingerprint of the run-time device determined by the run-time device upon first execution of the surrogate whitebox implementation and the build identifier; generating a locked whitebox implementation according to the received fingerprint of the first device and the build identifier, the locked whitebox implementation having a plurality of run-time device specific locked whitebox LUTs; transmitting the run-time device specific locked whitebox LUTs from the cloud service to the run-time device; receiving a request for a secret from the run-time device, the request including the build ID; and transmitting an encoded secret, the encoded secret generated by applying the run-time device specific node locking transformations to the secret. Another embodiment is evidenced by a processor communicatively coupled to a memory storing processor instructions for performing the foregoing steps.

BRIEF DESCRIPTION OF THE DRAWINGS

Referring now to the drawings in which like reference numbers represent corresponding parts throughout:

FIG. 5A-5C are diagrams presenting exemplary process steps for performing node locking a whitebox implementation to enable secure generation of an output of the run-time device;

FIG. 8A-1 is a diagram illustrating representative pseudo-code for carrying out the function as represented in FIG. 7A;

FIG. 8A-2 shows a flow diagram of the general steps carried out by the pseudo code, and these steps are shown in the pseudo code;

FIG. 8B-1 is a diagram illustrating representative pseudo-code for carrying out the function as represented in FIG. 7B;

FIG. 8B-2 is a flow diagram of the general steps carried out by the pseudo code, and these steps are shown in the pseudo code.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A secure cloud-based node-locking service with built-in attack detection to eliminate fuzzing, cloning and other attacks is disclosed below. White-box base files are securely stored on the cloud service and are not vulnerable to accidental leakage. A secure cloud-based dynamic secret encoding service reduces the risk of exposure of unprotected secrets and other sensitive data.

Figure 1:
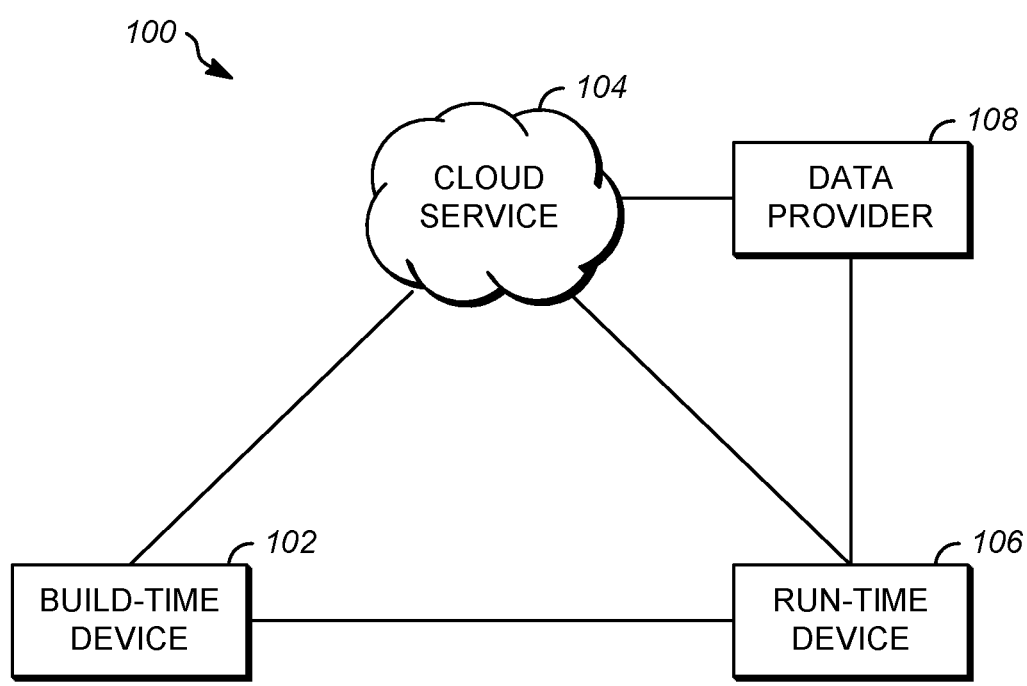
FIG. 1 is a diagram depicting a secure data distribution system.

FIG. 1 is a diagram depicting a secure data distribution system 100. The system comprises a build-time device 102 that generates data and instructions for distribution to one or more communicatively coupled run-time devices 106. The run-time device(s) 106 use the instructions to convert data provided from a communicatively coupled data provider 108 to generate output that can be used, for example, to decode or decrypt other data. Data may be provided from/to the devices 102, 106 and the data provider 108 via cloud service 104, described more fully below. In one embodiment, the run-time device 106 is a set top box (STB) or similar device for decrypting encrypted media content using one or more keys generated from an encrypted keys obtained from the data provider 108 using the data and instructions provided to the run-time device 106 by the build-time device 102.

Whitebox Cryptography

The core idea of white-box cryptography is to mathematically alter a program so that the program directly operates on encrypted and encoded secrets without these ever being present in cleartext form. Since these secrets are never present in cleartext form, the attacker can have complete visibility and control of the application and still not be able to make use of or gain any value from them. White-boxes can be static or dynamic. Table-based white-box transformations compose random bijections with an application's functions. These compositions are emitted as lookup tables (LUTs) so as to conceal the underlying secrets and other state values in the white-box implementation.

Figure 2A:
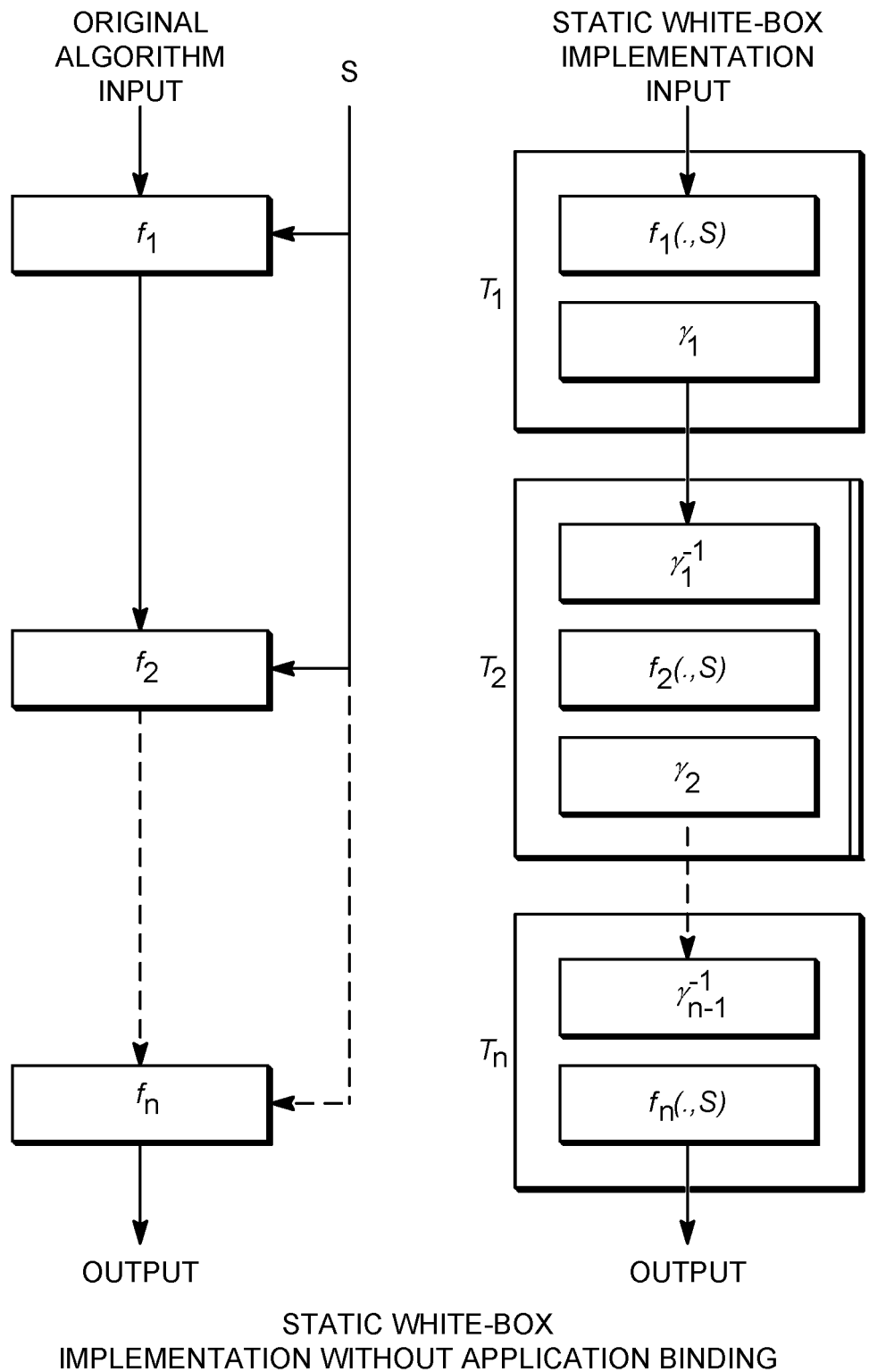
FIG. 2A is a block diagram showing the functional representation of an original algorithm, and a static white-box implementation.

FIG. 2A is a block diagram showing the functional representation of an original algorithm, and a static white-box implementation. Static whiteboxes have fixed secrets that are hard coded at build-time (e.g. when the whitebox is built). Original program comprises functions/operations $f_1, f_2, \ldots, f_n$ in an original algorithm (left hand side of FIG. 2A) along with a fixed secret S (such as a key). The program takes (encrypted) input data flows and secret key S and uses those inputs to generates (decrypted) output data flows. The (static) white-box implementation of the original program is generated by taking the functions $f_1, f_2, \ldots, f_n$ and the secret key S and encoding them as a lookup-tables (LUTs) $T_1, T_2, \ldots, T_n$ in the static white-box implementation of that algorithm (defined by the original program code) (right hand side of FIG. 2A). The encodings are generated as a sequence of random bijections, $\gamma_1, \gamma_2, \ldots, \gamma_{n-1}$. This provides some degree of protection but is still vulnerable to code-lifting attacks.

Figure 2B:
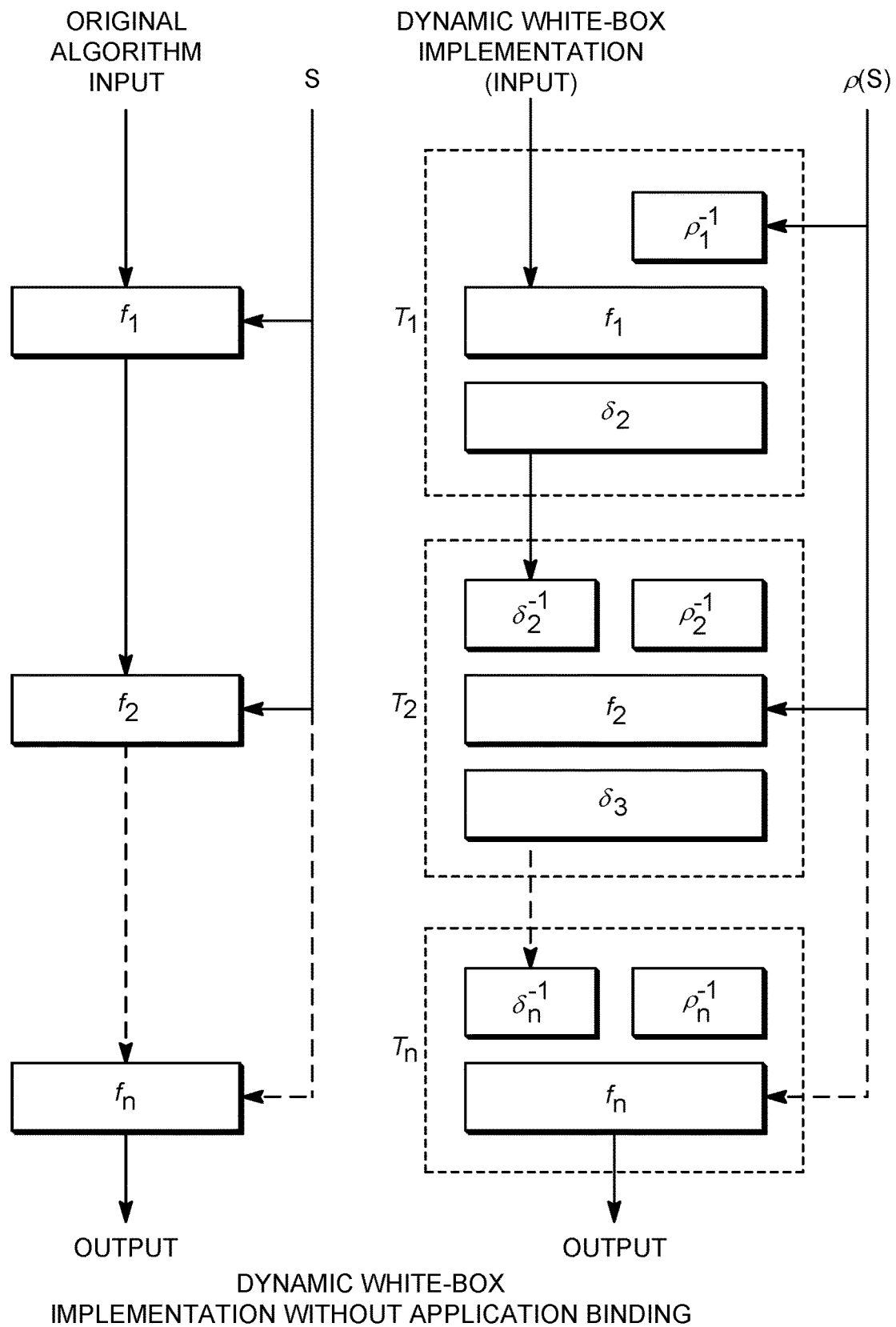
FIG. 2B is a block diagram showing the functional representation of an original algorithm, and a dynamic white-box implementation of the original.

FIG. 2B is a block diagram showing the functional representation of an original algorithm, and a dynamic white-box implementation of the original algorithm. Dynamic whiteboxes can receive encoded secrets at run-time. The alternative whitebox implementation illustrated in FIG. 2B is a dynamic white-box implementation (without application binding) of the original program could be generated instead. In this process, the original program has functions/operations $f_1, f_2, \ldots, f_n$ in an original algorithm, each of which is encoded as a lookup-table $T_1, T_2, \ldots, T_n$ in the dynamic white-box implementation of that algorithm (original program). The encodings are generated a sequence of random bijections, $\rho_1, \rho_2, \ldots, \rho_n$ that are applied to the inputs and output of each operation, where ρ(S) represents an encoded secret (e.g. a secret key), which is provided dynamically to the white-box implementation. The bijections $\delta_1$ and $\delta_{n+1}$[1] are referred to as external encodings and relate the application.

Node Locking

White-box node-locking restricts the operation of a white-box implementation to a specific node to mitigate code-lifting attacks, which is where the implementation is moved from an authorized node to an unauthorized one.

A node can refer to a hardware device, containerized environment, virtual machine instance or any combination thereof along with any combination of application, customer, and end-user identifiers.

The definition of a node is configured by the developer based on the data elements that comprise a node's fingerprint, which is the unique identifier of that node. Node locking is disclosed, for example, in U.S. Patent Publication 2018/0167197, which is hereby incorporated by reference herein.

Figure 3:
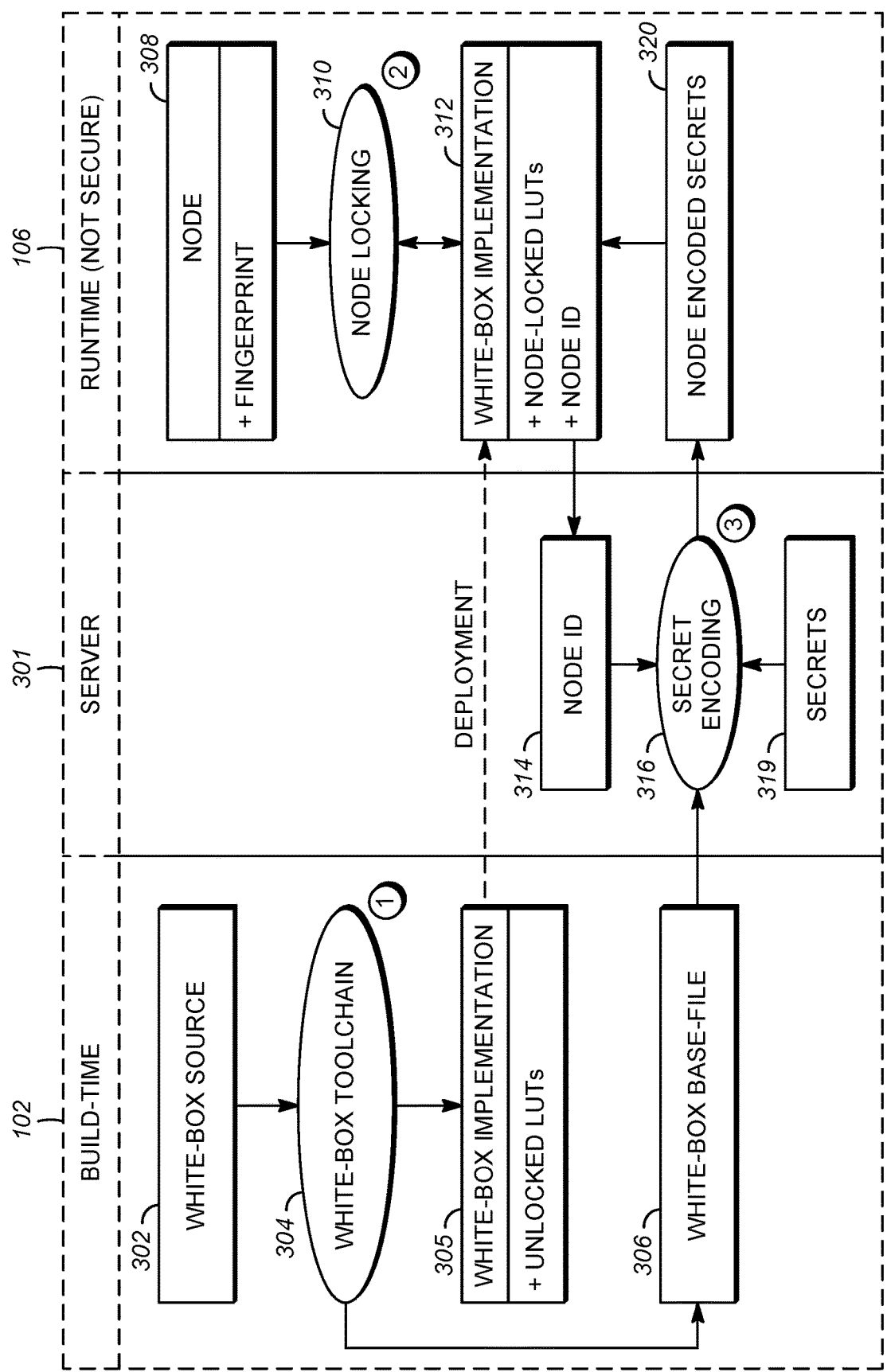
FIG. 3 is a diagram presenting a top level flow of the process of locking a whitebox implementation to a node algorithm.

FIG. 3 is a diagram presenting a top level flow of the process of locking a dynamic whitebox implementation to a node. Referring first to process (1), a build-time device 102 uses a whitebox toolchain 304 (instructions for converting whitebox source code 302 into a whitebox implementation 312) to operate on the whitebox source 302 to convert the whitebox source code 302 into a whitebox implementation. The white-box toolchain 304 generates a base file and a white-box implementation at build-time. A base-file is essentially a white-box private key that is used to build the white-box and encode secrets for its use. The whitebox implementation 305 has a series of unlocked lookup-tables (LUTs). These LUTs are unable to operate until they are locked to a specific node. The whitebox implementation is then deployed to the run-time device 106. During node-locking every LUT in a white-box implementation is encoded for a specific node fingerprint. This may be carried out at installation or first-time operation.

Since every part of the white-box implementation is dependent on a specific (independently sampled) node fingerprint there is no single point of failure, a common weakness with traditional node-locking and licensing systems.

Referring to step (2), the run-time device performs a node-locking process 310, in which the fingerprint of the run-time device 106 is generated, along with a Node ID, which is a unique identifier representing a specific white-box implementation locked to a particular node fingerprint. The Node ID and fingerprint is transmitted to the server 301, which generates node-locked LUTs and transmits them to the run-time device 106, where they are stored. Referring to step (3), when the run-time device 106 needs a dynamic secret (for example, a key needed to decrypt encrypted content), the whitebox implementation 312 executing on the run-time device 106 requests the dynamic secret by sending its Node ID to a server 301. If the request is valid, the server 301 selects or generates the appropriate secret 319, then encodes the secret using the appropriate transformation, based on the Node ID. The node encoded secret 320 is then provided to the whitebox implementation 312, which uses the encoded secret to decode or decrypt the desired information.

The foregoing node locking process carried out on insecure nodes such as server 301 is vulnerable to cloning, fuzzing and other attacks. Cloning attacks are attacks in which the node configuration is duplicated to appear identical to a legitimate node in order to replicate a valid node fingerprint. Fuzzing attacks are when a number of locking requests originate from the same node, indicating attempts to analyze or circumvent the node-locking mechanism.

Other attacks may include side-channel attacks, tampering and reverse-engineering. White-box base-files (private keys) may be inadvertently leaked from the build environment, allowing an attacker to circumvent the white-box protection altogether. Further, secret encoding for specific node-locked nodes requires additional server infrastructure that developers may not be able to implement securely.

To resolve these issues, a secure cloud-based node-locking service with built-in attack detection to eliminate fuzzing, cloning and other attacks is described below. White-box base files are securely stored on the cloud service and are not vulnerable to accidental leakage, and a secure cloud-based dynamic secret encoding service reduces the risk of exposure of unprotected secrets and other sensitive data.

Cloud-Based Whitebox Node Locking

Figure 4:
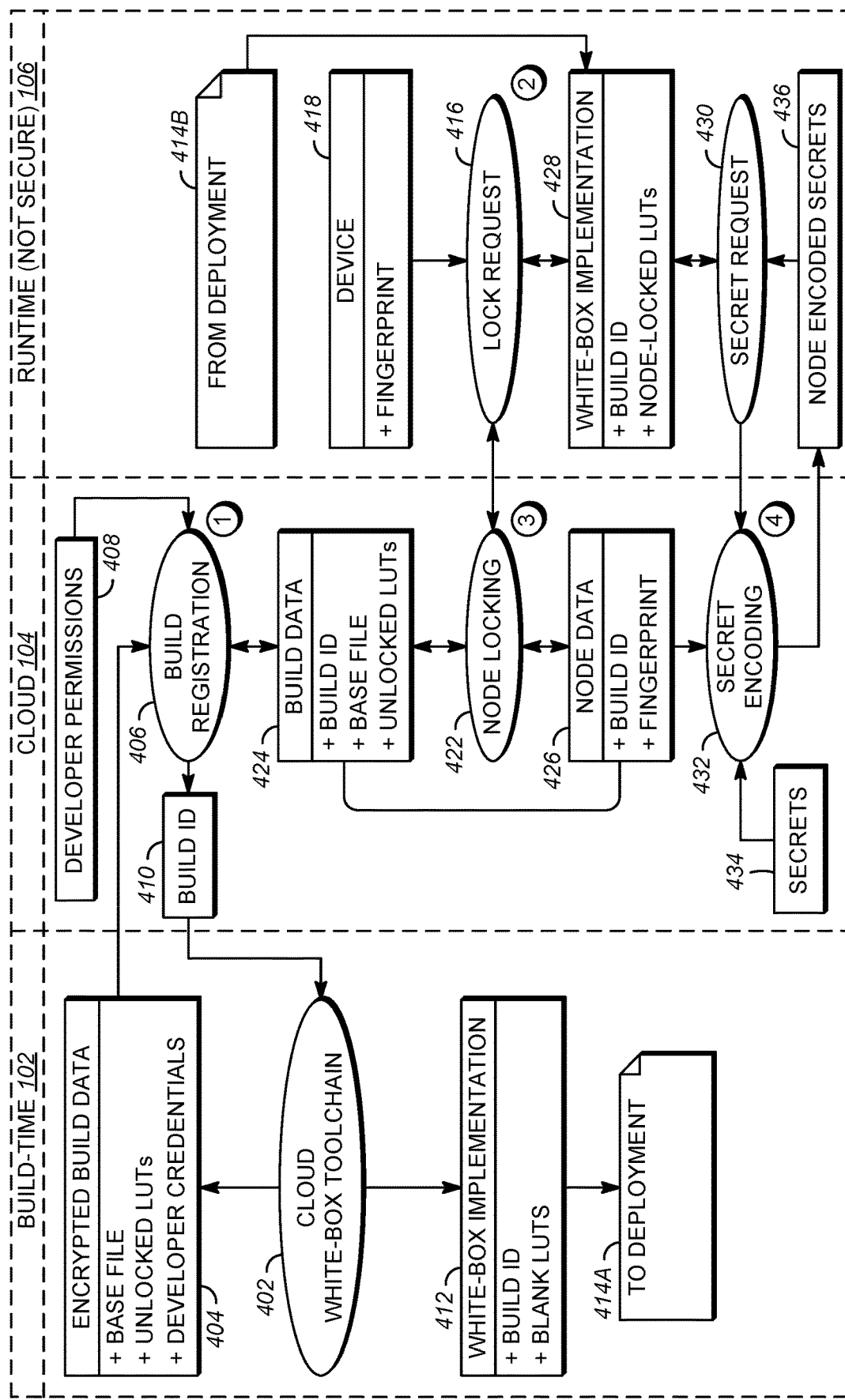
FIG. 4 is a diagram presenting an overview of one embodiment of how cloud-based white-box node-locking can be performed.

FIG. 4 is a diagram presenting an overview of one embodiment of how cloud-based white-box node-locking can be performed. In step (1), a white-box cloud-enabled toolchain 402 generates build data 404 including a base file along with a list of unlocked white-box lookup-tables (LUTs), and securely registers that build data 404 with the cloud service 104. In one embodiment, this registration is performed securely by encrypting the build data 404 before transmission to the cloud service 104. The build data may also include developer build-time device credentials, which are compared to developer permissions 408, and registration will fail if a comparison between the developer credentials and the developer permissions 408 indicates that the developer credentials are invalid or insufficient. The cloud service 104 performs the build registration 406, and returns a build ID 410 to the toolchain 402, which is embedded into the white-box implementation 412 along with the sequence of blank LUTs. This is an initial implementation that cannot operate unless it is node-locked. This white-box implementation is deployed from the build-time device 102 to the run-time device 106, as shown in blocks 414A and 414B.

In step (2), a lock request is initiated at run-time by the run-time device 106. This securely sends the node's fingerprint 418 and the white-box build ID 410 to a cloud service 104 node-locking endpoint.

In step (3), the cloud service 104 node-locking endpoint validates the lock request. Invalid requests or attempted cloning or fuzzing attacks can be detected at this point. If the lock request is successfully authenticated, a whitebox implementation 428 having the resulting node-locked LUTs and the build ID is generated as shown in block 422. The cloud service 104 node-locking endpoint uses the node data 426 to apply node (e.g. run-time device) specific locking transformations to the unlocked LUTs received from the build-time device 102 during registration and stored in its database according to the to generate the whitebox implementation 428. The whitebox implementation 428 having the resulting node-locked LUTs and the build ID is then returned to the run-time device 106. This enables normal operation of the white-box implementation 428 on that specific run-time device 106. Cloning attacks can be identified when a threshold number of locking requests for the same fingerprint originate from different IP addresses. Further, fuzzing attacks can be identified when a single IP address generates a threshold number of locking requests.

Finally, in step (4) the run-time device 106 issues a request for the secret 430 to the cloud service 104. The cloud service retrieves the requested secret 434, and encodes 432 the secrets according to the base file to generate node-encoded secrets 436, which are provided to the node-locked whitebox implementation 428. These node-encoded secrets are only able to be used by that specific white-box implementation 428 on that specific node. or run-time device 106. The request for the secret can occur during node-locking or subsequently when the run-time device 106 invokes an operation requiring processing of a secret by the node locked whitebox implementation 428. The encoded secret is then provided to the whitebox implementation 428, and used to generate the desired value(s), for example, a key usable to decrypt at least a portion of a media program.

Figure 5B:
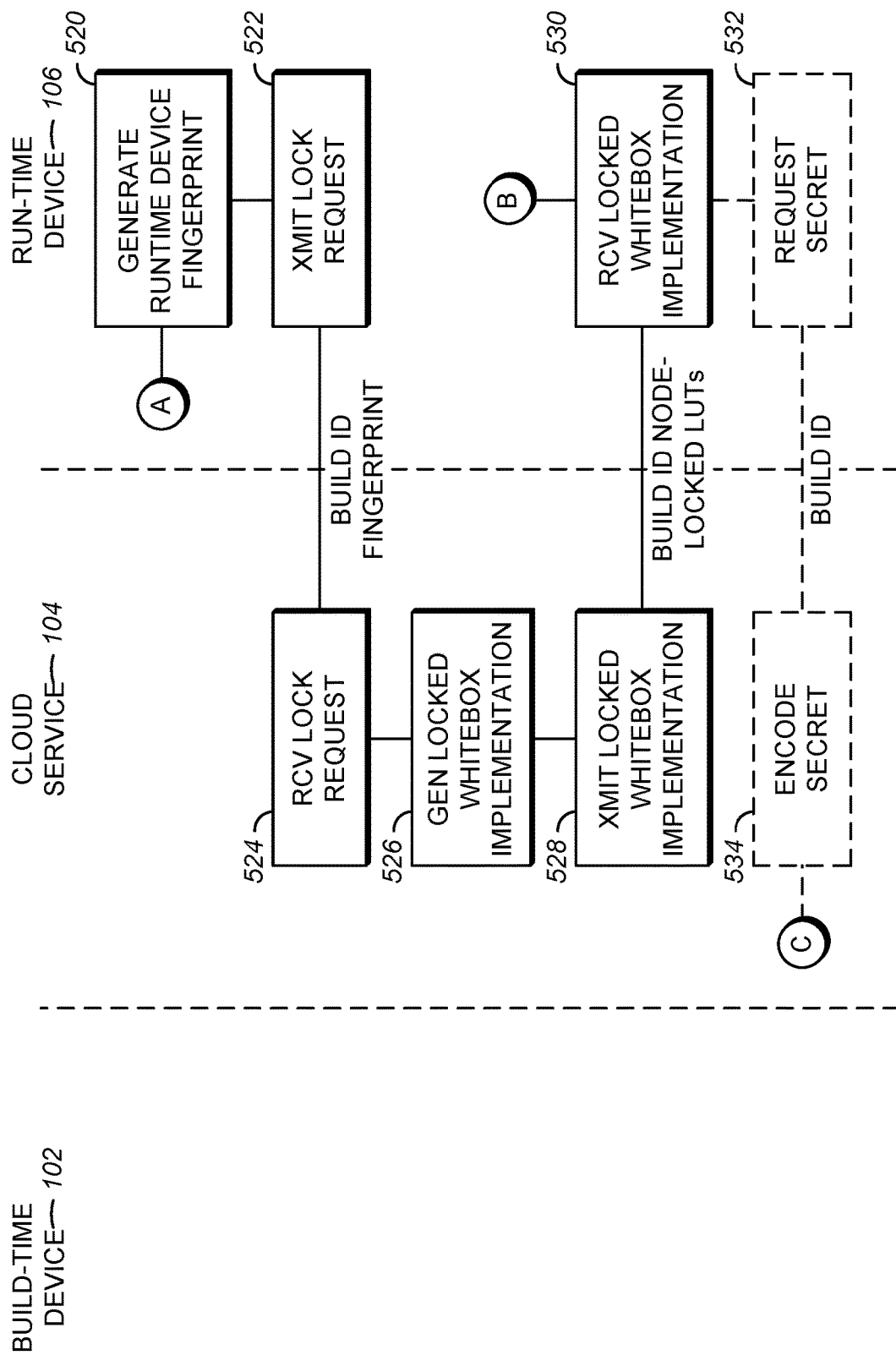
Figure 5C:
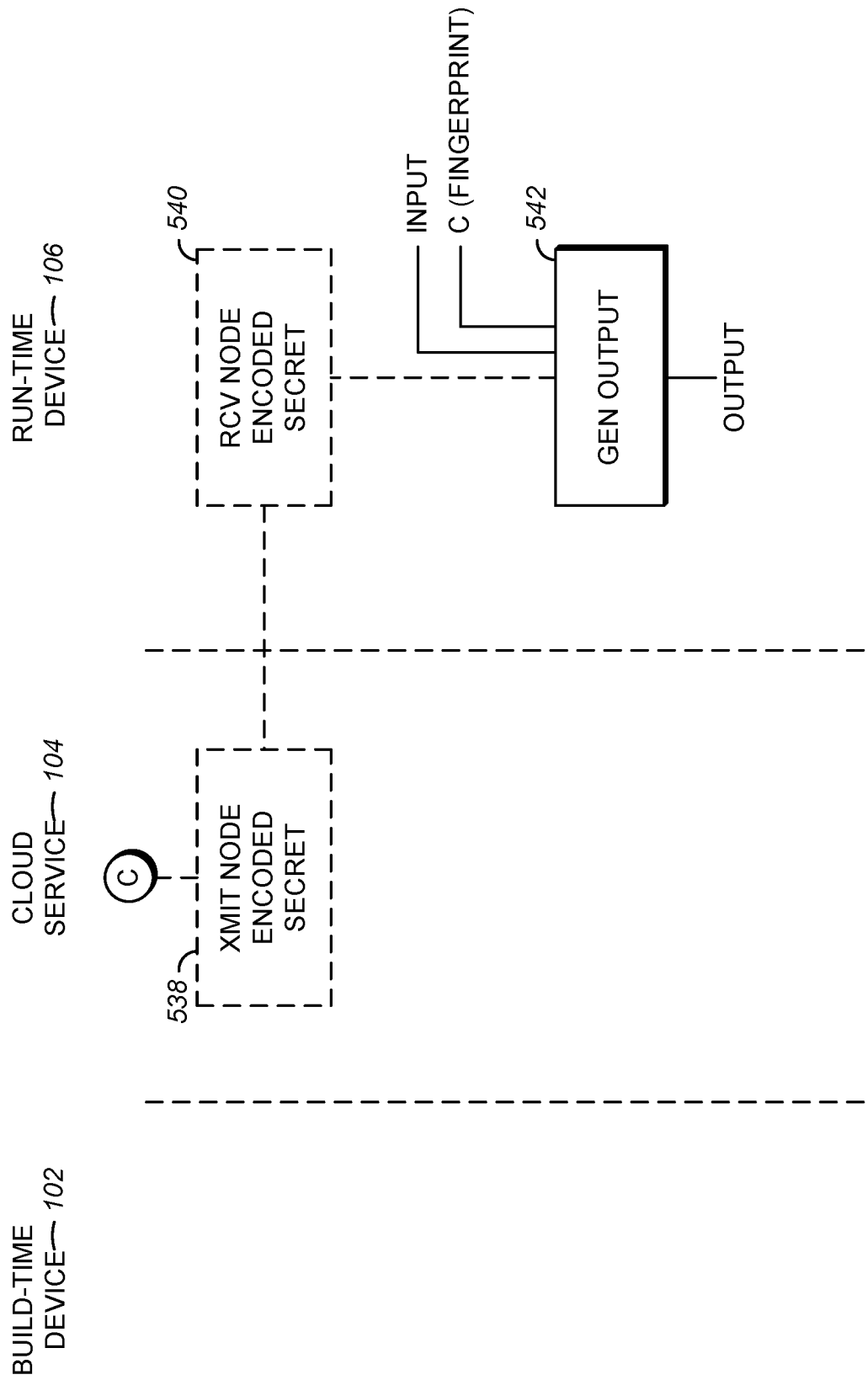

FIGS. 5A-5C are diagrams presenting exemplary process steps for performing node locking a whitebox implementation to enable secure generation of an output of the run-time device 106 in further detail. In block 502, the build-time device generates a whitebox implementation 412. This is accomplished, for example, as described in FIGS. 2A and 2B and the text appurtenant thereto. The whitebox implementation 412 includes a base file and a plurality of unlocked LUTs. In block 504, the build-time device 102 transmits a registration request to the cloud service 104. The registration request comprises build data comprising the base file and the plurality of unlocked LUTs (or a list of unlocked LUTs). In block 506, the registration request is received. In block 508, the base file and the unlocked LUTs are registered in the cloud service 104. In block 510, the cloud service 104 returns a surrogate whitebox implementation comprising blank LUTs and a build ID that identifies the surrogate whitebox implementation. The build ID is later used to associate lock requests with the surrogate whitebox implementation when generating the locked whitebox implementation.

In block 512, the build-time device 102 receives the surrogate whitebox implementation and deploys it to the run-time device 106, as shown in block 514. This deployment may occur before the run-time device 106 device is distributed to the ultimate user (e.g. downloaded as a part of the manufacturing process) or deployed after the run-time device 106 is distributed to the user (e.g. by a download). In block 516, the run-time device accepts the deployed whitebox implementation.

Turning to FIG. 5B, the run-time device generates and transmits a lock request. This can happen in response to a start or restart of the run-time device 106, or in response to invoking an application that requires use of the whitebox implementation, for example to securely generate an output. In block 520, the run-time device generates a fingerprint. The fingerprint is a value that at least somewhat uniquely identifies the run-time device. Exemplary fingerprints can include the MAC or IP address of the run-time device 106, a serial number of the run-time device 106, serial or identification numbers of modules within the run-time device 106. If it is desired to limit execution of the whitebox to only a class of run-time devices, the fingerprint may include an identifier common to that class of run-time devices 106, for example, a model number. The fingerprint may also comprise a combination of any or all of these values.

In block 522, the run-time device transmits the lock request which comprises the build ID and the fingerprint of the run-time device 106. In block 524, the cloud service 104 receives the lock request. The cloud service 104 then determines whether and how to respond to the lock request from the run-time device. In one embodiment, the lock request is transmitted from an address of the run-time device (and may optionally be automatically transmitted upon startup of the run-time device or upon a first request to execute the surrogate whitebox implementation deployed to the run-time device 106. The cloud service 104 can then check to determine if a preceding node locking request having the same build ID was earlier received from a different run-time device 106 (for example, as determined by the lock request having the same build ID being received from a different address). Since this would indicate a cloning attack, the lock request may be denied by transmitting a message back to the run-time device 106 and/or the build-time device 102 associated with the build ID. The cloud service may also check to determine if a preceding node locking request having a different build identifier was received from the first address. While a small number of node locking requests having different build identifiers may be expected in some circumstances (e.g. several run-time devices 106 deployed at in the same home or location), a large number of requests having different build IDs received from the same address would be an indication of a fuzzing attack. Such attacks, where there are a large number of locking request originating from the same node, indicates an attempt to analyze or circumvent the node locking security mechanism, and when identified, such node locking requests can be denied, again by a message sent to the run-time device and/or the build-time device 102. Advantageously, placing these operations in a cloud service provides secret encoding for specific node-locked nodes without requiring additional server infrastructure that developers may be unable to implement securely.

If no attacks are detected, the cloud service 104 generates a node-locked version of the whitebox implementation according to the received fingerprint of the run-time device 106 and the build ID, as shown in block 526. This creates the node-locked program (being a white-box, node-locked implementation of the original program).

Node Locking a Static Whitebox Implementation of the Original Program

Figure 6A:
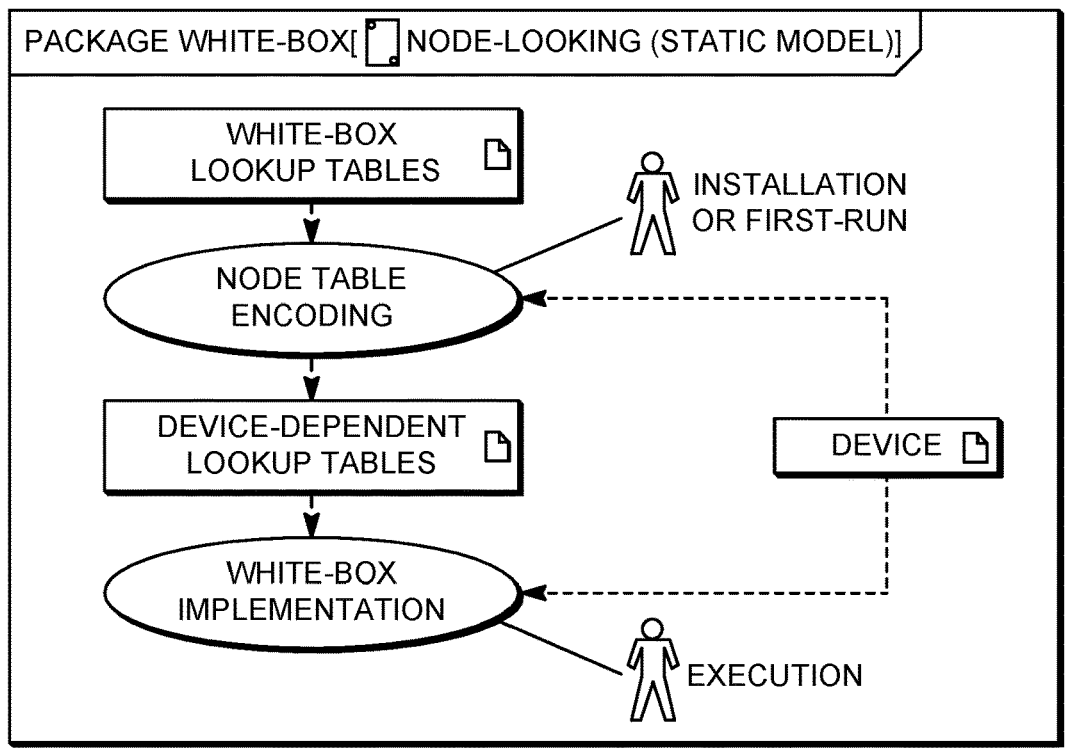
FIG. 6A is a diagram showing the structure of the node-locking for a static white-box implementation of an original program.
Figure 7A:
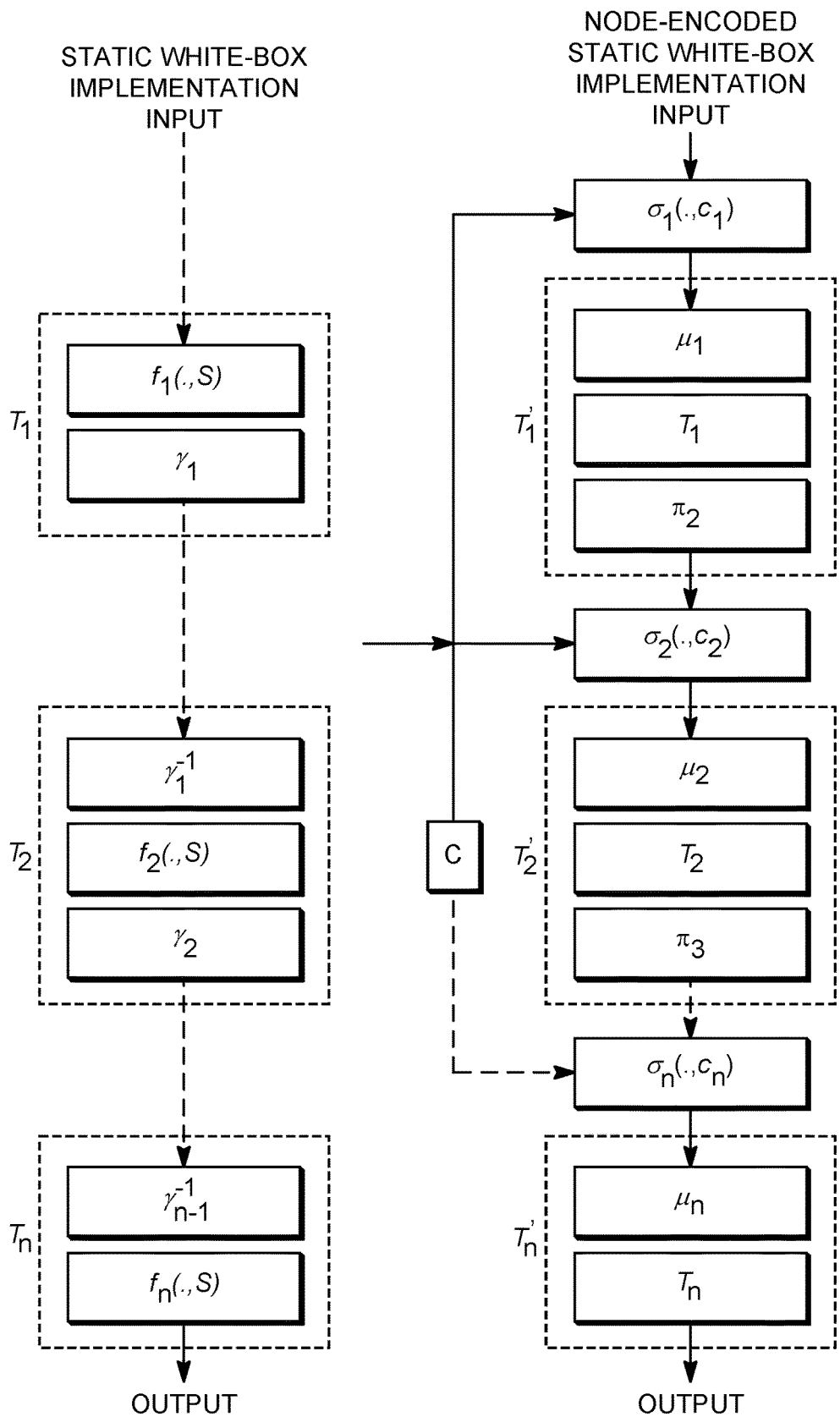
FIG. 7A is a diagram showing a block-level functional form of the static white-box implementation of the original program implementing the original algorithm and in block-level functional form the resulting node-locked version of the white-box implementation of the original program/algorithm.

Referring to FIGS. 6A and 7A, the node-locking of static white-box implementation of the original program will be described. This generates a node-locked program (that is, a (static) white-box implemented, node-locked program).

FIG. 6A shows in diagrammatic form the structure of the node-locking for a static white-box implementation of an original program. A node-table encoding process takes the tables $T_1$ to $T_n$ generated as part of the white-box implementation and encodes them with parameters from the device on which the node-locked program will be executed. This results in device dependent tables, which are used as the tables in the node locked whitebox implementation of the original program.

Referring to FIG. 7A, the node-locked program as described above is constructed as follows. (Note, FIG. 7A shows in block-level functional form the static white-box implementation of the original program implementing the original algorithm (left hand side) from FIG. 2A and in block-level functional form the resulting node-locked version of the white-box implementation of the original program/algorithm (right hand side)).

Referring to the left hand side of FIG. 7A, let i∈I be a white-box implementation instance with encoded lookup-tables $T_1, \ldots, T_n$, each with symbols in a non-empty, finite alphabet $T=\{0, 1, \ldots, m-1\}$ and let $N=\{1, \ldots, r\}$ for some $r \geq m!$ then let $C=(c_1, c_2, \ldots, c_n) \in N^n$ be a configuration vector that uniquely identifies a device instance (e.g. media player or other device the node-locked program will execute on). The configuration vector can be generated from the fingerprint, for example. Let be the set of all surjective functions from N to $S_T$, where $S_T$ denotes the set of permutations of T.

For example, for a white-box implementation with n lookup-tables, each device stores n indices cj in the range $1 \leq cj \leq m! \leq r$. For m=256, suppose the implementation has n=123 lookup-tables, then the lower-bound storage for C on each device is $123 \times \log_2 (256!) = 123 \times 210$ bytes, or 26 Kb.

The right hand side of FIG. 7A shows the node-encoded (that is, node-locked) static white-box implementation. random bijections $\mu_1, \mu_2, \ldots, \mu_n, \pi_1, \pi_2, \ldots, \pi_{n+1} \in ST$ and functions $\sigma_1, \sigma_2, \ldots, \sigma n \in \Sigma$ are generated so that for each coordinate $c_1$ of C and all inputs x, it holds that $\mu_j(\sigma_j(\pi_j(x), c_j))=x$, where the external encodings $\pi_1$ and $\pi_{n+1}^{-1}$ are introduced to bind the white-box implementation to the calling application; and each table $T_1, \ldots, T_n$ is replaced (as illustrated on the right-hand-side) with node-encoded tables $T'_1, \ldots, T'_n$ to bind the white-box implementation to the device instance, identified by C.

Figures 2, 8A:
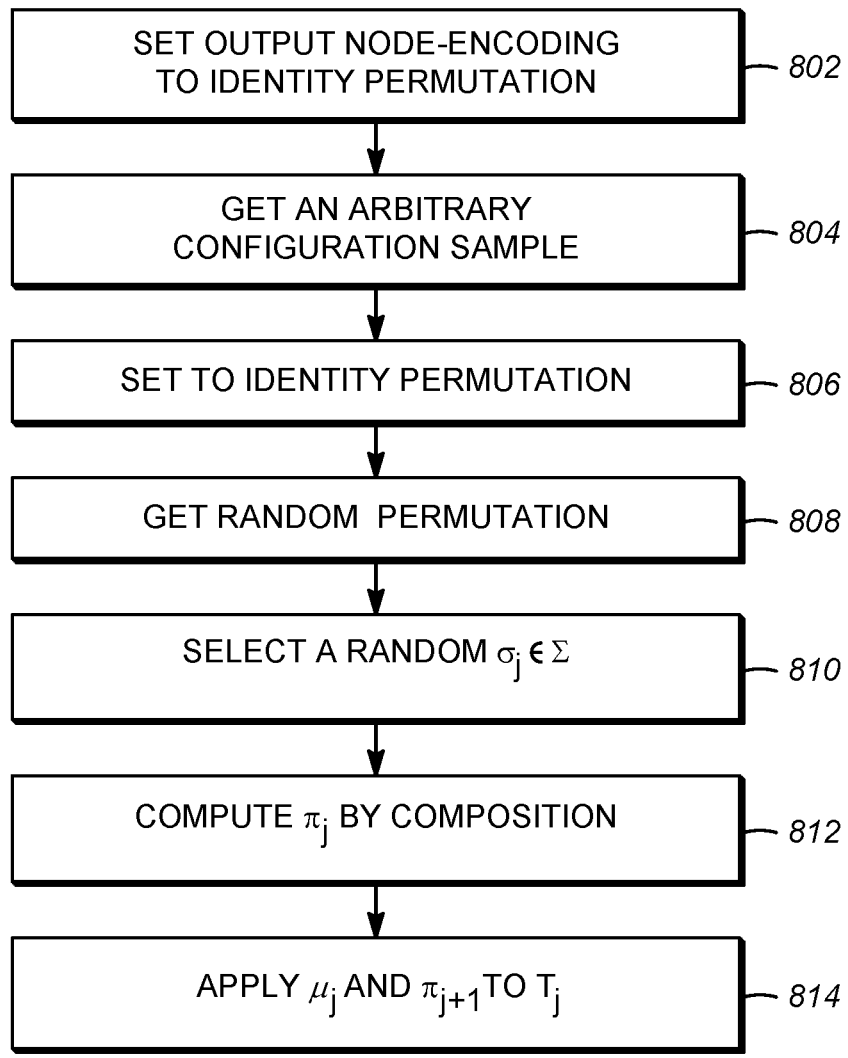

FIG. 8A-1 is a diagram illustrating representative pseudo-code for carrying out the function as represented in FIG. 7A. This pseudocode represents program code in the controller that is configured to carry out the process, including instructions 802-814.

FIG. 8A-2 shows a flow diagram of the general steps carried out by the pseudo code, and these steps are shown in the pseudo code, including steps 802-814.

Node Locking Dynamic Whitebox Implementation

Alternatively, a dynamic white-box implementation is used. In addition to the security of static white-box node-locking, dynamic white-box node-locking also binds the encoded secret to a distinct node-locked device instance:

1. Code-lifting of a node-locked instance will necessitate the interception and injection of the node-encoded secret $s''_i$, thus adding a layer of resilience against key-transfer attacks. This applies to all designs, including those with low implementation diversity or those without a key-ladder.
2. The secret $s''i$ is customized to a particular device, thus allowing traceability back to the compromised implementation.

Referring to FIGS. 6B, 7B, 8B-1 and 8B-2, the node-locking of dynamic white-box program (without application binding) will be described. This generates a protected program (that is, a (dynamic) white-box, node-locked program).

Figure 6B:
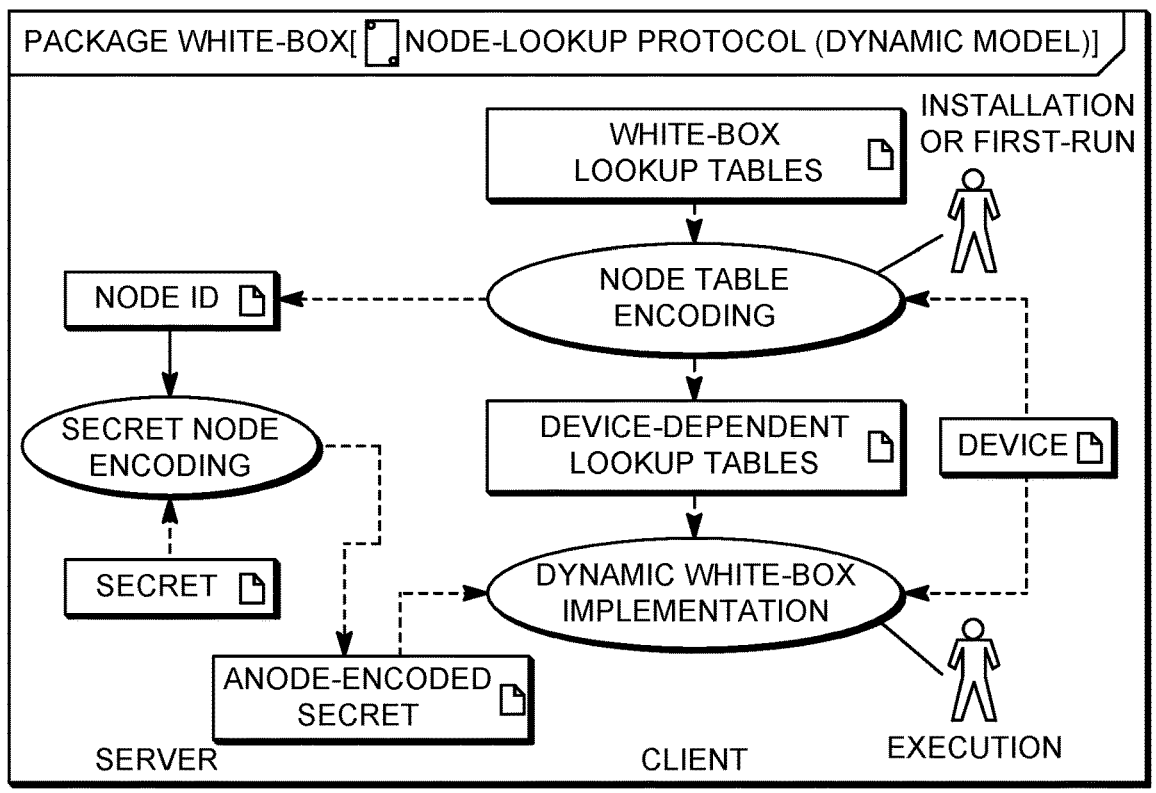
FIG. 6B is a diagram showing the structure of the node locking for a dynamic whitebox implementation of an original program.

FIG. 6B shows in diagrammatic form the structure of the node locking for a dynamic whitebox implementation of an original program. A node table encoding process takes the tables $T_1$ to $T_n$ generated as part of the whitebox implementation and encoded them with parameters from the device on which the node-locked program will be executed. This results in device dependent tables, which are used as the tables in the node locked whitebox implementation of the original program.

Figure 7B:
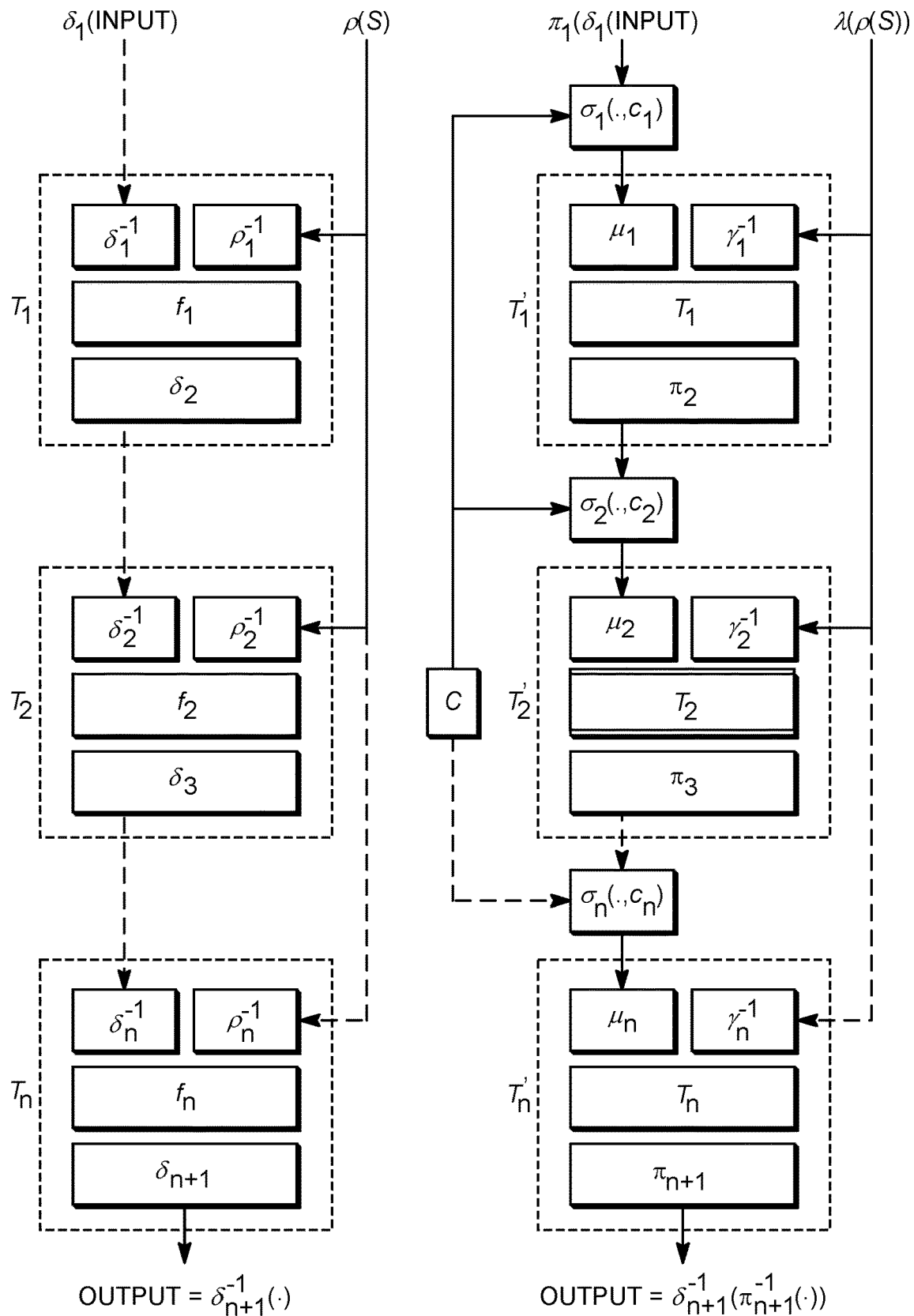
FIG. 7B is a diagram of a node-locked program.

Referring to FIG. 7B, the node-locked program as described above is constructed as follows. (Note, FIG. 7B shows in block-level functional form the dynamic white-box implementation of the original program/original algorithm (left hand side) from FIG. 4B and in block-level functional form the resulting node-locked version of the white-box implementation of the original program/original algorithm (right hand side)).

Random bijections $\mu_1, \ldots, \mu_n, \lambda_1, \ldots, \lambda_n, \pi_2, \ldots, \pi_n \in S_T$ and functions $\sigma_1, \sigma_2, \ldots, \sigma_n \in \Sigma$ are generated to bind the white-box implementation to the device instance and the dynamic secret $s_i''=\lambda(\rho(S))$.

Figures 2, 8B:
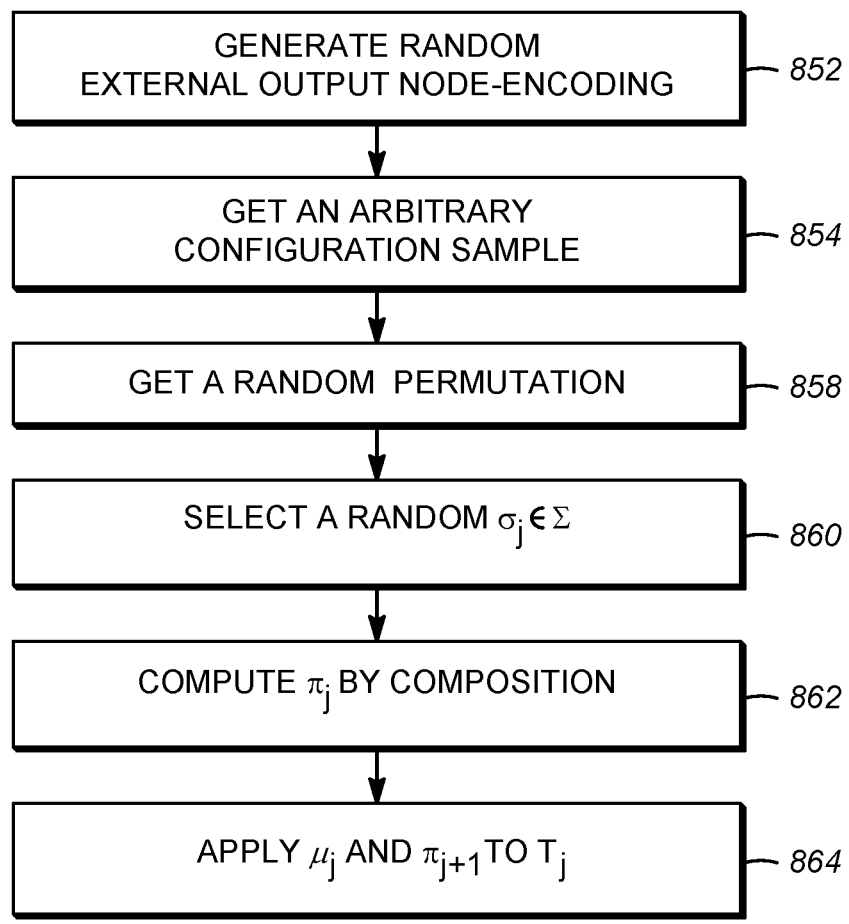

FIG. 8B-1 is a diagram illustrating representative pseudocode for carrying out the function as represented in FIG. 7B. This pseudocode represents program code in the controller that is configured to carry out the process, including process steps 852-864.

FIG. 8B-2 shows a flow diagram of the general steps carried out by the pseudo code, and these steps are shown in the pseudo code, including steps 852-864.

Returning to FIG. 5B, the build ID and the node-locked whitebox implementation is transmitted to the run-time device 106, as illustrated in block 528. The run-time device receives the locked whitebox implementation in block 530 and can now use the whitebox to generate output.

In the case of a static node-locked whitebox, the run-time device 106 applies the input to the whitebox (and the fingerprint C) to the node locked whitebox to generate the output, as shown in block 532.

In the case of a dynamic node-locked whitebox, the run-time device 106 invokes the node-locked whitebox to generate the output. This requires that the run-time device 106 obtain a secret for use with the whitebox. Since the whitebox invoked by the run-time device is the node-locked whitebox generated using the build ID and the fingerprint of the run-time device, the secret must be encoded for use in the node-locked whitebox. Accordingly, the run-time device 106 transmits a request to the cloud service 104 to request the secret, as shown in block 532. The request comprises the build ID, thus identifying the node-locked whitebox for which the encoded secret is requested. The cloud service 104 then looks up the secret and encodes the secret, as shown in block 538, and transmits the encoded secret to the run-time device 106. In block 540, the run-time device 106 receives the encoded secret and in block 542, the run-time device generates the output from the input and the fingerprint.

Use Cases

One possible example, a node-locked program generated as described above could be used in place of the original program that provides decryption, decompression and/or decoding functionality used in media streaming delivery systems. Atypical existing media streaming delivery system includes a media server implemented at the data provider 108, a media player as the run-time device, generating an output provided to an audio-visual system (display). The media server takes media content and executes algorithms to generate a media stream (becoming input data stream) embodying the media content in an encrypted and compressed form, and a server (such as a web server, broadcasting transmitter or the like) transmits the stream over a suitable transmission channel, such as an internet channel, telecommunications channel, or a television broadcast transmission. The encrypted media stream is received at a media player at the end user/subscriber's location for consumption.

The media player 82 is the data flow receiver hardware and software instructions to execute a decryption and codec algorithm and an output interface. The media player is one example of a data flow receiver computer system 900 such as that more generally described in FIG. 9. The processor receives the input media stream either directly or from the data provider and executes instructions implementing algorithms to decrypt and decompress the media stream. This results in an output media stream with the media content that is then passed through the output interface to the output device, which might be an audio-visual system such as a television.

If an unauthorized party intercepts the media stream in the transmission channel 116, they cannot easily retrieve the media content 114 and us it unless they know the decryption algorithm. However, an adversary could use code lifting and/or key recovery attacks as described previously on this type of arrangement.

Instead of the processor in the media player executing the original program embodying the decryption and codec algorithms A with functionality F, the processor executes the protected program, which is generated from the original program as described previously. The program is node-locked to the media player as described herein, and can only execute on that device as its execution relies on interacting with parameters specific to the media player. The media server operates in the usual manner. It retrieves the media content, generates a media stream, encrypts, and compresses the media stream and then transmits the compressed and encrypted media stream over the transmission channel using a server, broadcast, or other suitable transmission. The encrypted and compressed media stream is received at the media player in the usual manner. The media player executes the protected program to implement decryption and codec functionalities F to decrypt and decompress the media stream, and extract the media content.

The media content output stream is passed to the output device for display of the media content. A white box implementation of original program prevents, or at least slows down, an adversary from making a key recovery attack. This is because the key is formed as part of the white box implementation of the program, or an encoded static or dynamic key is used. A white box implementation of a program can still be vulnerable to a code lifting attack. Node-locking the WBI program to a particular device prevents, or at least slows down adversary, from carrying out a code-lifting attack. In such a situation, it might still be possible for an adversary to code-lift the WBI program and the application it executes on. In this case, the option of also carrying out application binding of the WBI program to the application executes on prevents, or at least slows down, an adversary from code-lifting the WBI program with the application.

As noted, the above examples are one embodiment only, and there other end uses for node-locking as described. In addition to streaming media applications, the node-locking could also be used for (1) document management systems, where documents are shared between authorized parties, (2) media or software license management, where verification of licenses is required, (3) media players in a web browser or other untrusted platform, or (4)

More generally, a data flow receiver that receives a stream of encrypted data and contains a program to decrypt that stream to provide unencrypted output, or any system on an untrusted platform where the program needs to protection from untrusted parties.

Hardware Environment

Figure 9:
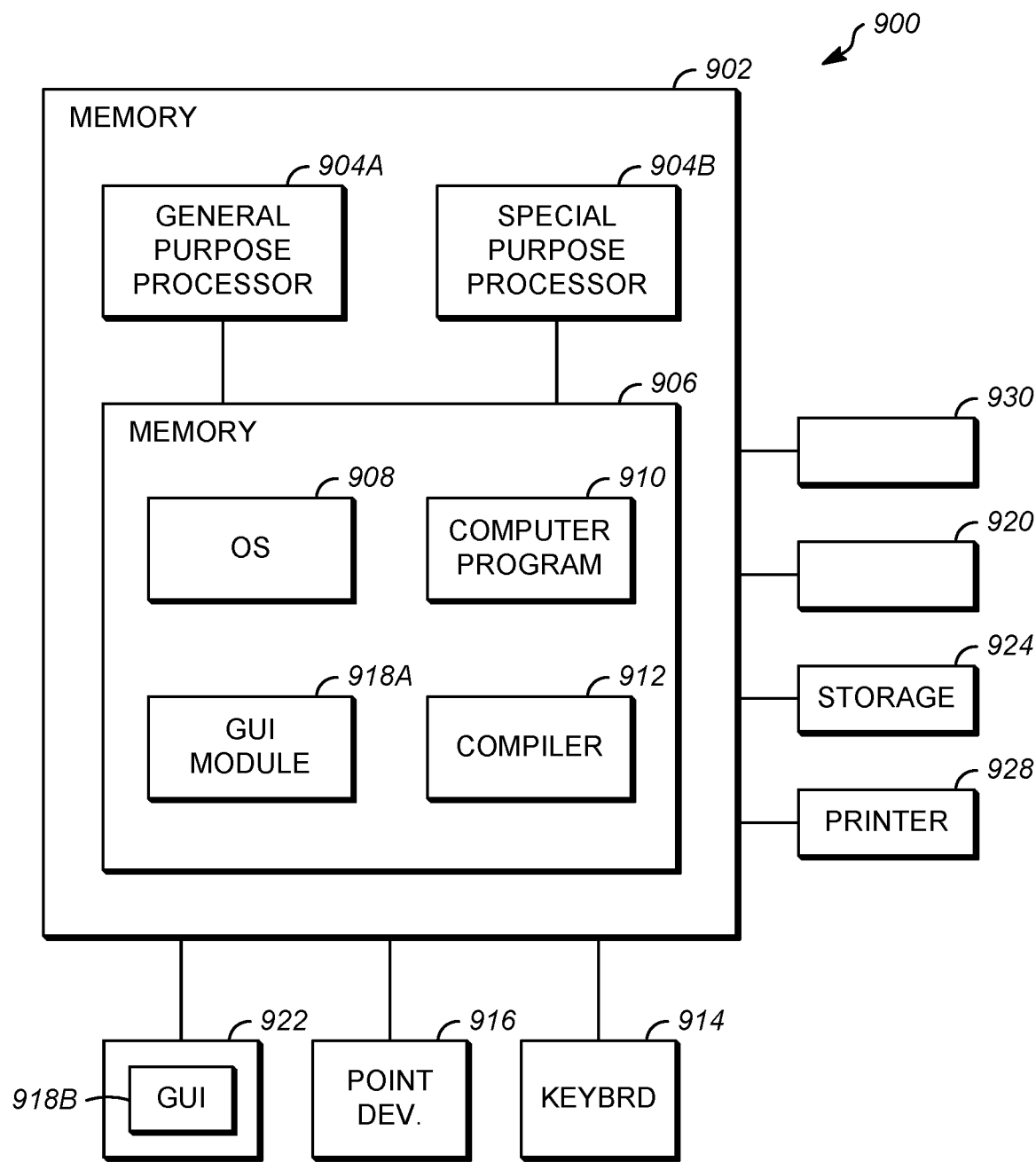
FIG. 9 is a diagram illustrating an exemplary computer system that could be used to implement elements of the present invention.

FIG. 9 is a diagram illustrating an exemplary computer system 900 that could be used to implement elements of the present invention, including the build-time device 102, a server or other device implementing the cloud service 104, the run-time device 106, and servers or other devices used by the data provider 108.

The computer 902 comprises a general purpose hardware processor 904A and/or a special purpose hardware processor 904B (hereinafter alternatively collectively referred to as processor 904) and a memory 906, such as random access memory (RAM). The computer 902 may be coupled to other devices, including input/output (I/O) devices such as a keyboard 914, a mouse device 916 and a printer 928.

In one embodiment, the computer 902 operates by the general purpose hardware processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908 to provide output and results.

Output/results may be presented on the display 922 or provided to another device for presentation or further processing or action. In one embodiment, the display 922 comprises a liquid crystal display (LCD) having a plurality of separately addressable pixels formed by liquid crystals. Each pixel of the display 922 changes to an opaque or translucent state to form a part of the image on the display in response to the data or information generated by the processor 904 from the application of the instructions of the computer program 910 and/or operating system 908 to the input and commands. Other display 922 types also include picture elements that change state in order to create the image presented on the display 922. The image may be provided through a graphical user interface (GUI) module 918A. Although the GUI module 918A is depicted as a separate module, the instructions performing the GUI functions can be resident or distributed in the operating system 908, the computer program 910, or implemented with special purpose memory and processors.

Some or all of the operations performed by the computer 902 according to the computer program 910 instructions may be implemented in a special purpose processor 904B. In this embodiment, some, or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 902 may also implement a compiler 912 which allows an application program 910 written in a programming language such as COBOL, C++, FORTRAN, or other language to be translated into processor 904 readable code. After completion, the application or computer program 910 accesses and manipulates data accepted from I/O devices and stored in the memory 906 of the computer 902 using the relationships and logic that was generated using the compiler 912.

The computer 902 also optionally comprises an external communication device such as a modem, satellite link, Ethernet card, or other device for accepting input from and providing output to other computers.

In one embodiment, instructions implementing the operating system 908, the computer program 910, and/or the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, or a flash drive. Further, the operating system 908 and the computer program 910 are comprised of computer program instructions which, when accessed, read, and executed by the computer 902, causes the computer 902 to perform the steps necessary to implement and/or use the present invention or to load the program of instructions into a memory, thus creating a special purpose data structure causing the computer to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 902.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

The foregoing discloses an apparatus, method, and system for enabling secure generation of an output in a run-time device. In one embodiment, the method comprises receiving a request to register a whitebox implementation for generating the output in a cloud service from a build-time device, the request comprising a base file and a list of unlocked whitebox look up tables (LUTs); registering the base file and the list of unlocked whitebox LUTs in the cloud service; returning a surrogate whitebox implementation having a build identifier (ID) and a plurality of blank LUTs to the build-time device; receiving lock request from the run-time device upon execution of the surrogate whitebox implementation, the lock request comprising a fingerprint of the run-time device determined by the run-time device upon first execution of the surrogate whitebox implementation and the build identifier; generating a locked whitebox implementation according to the received fingerprint of the first device and the build identifier, the locked whitebox implementation having a plurality of run-time device specific locked whitebox LUTs; transmitting the run-time device specific locked whitebox LUTs from the cloud service to the run-time device; receiving a request for a secret from the run-time device, the request including the build ID; and transmitting an encoded secret, the encoded secret generated by applying the run-time device specific node locking transformations to the secret.

Implementations may include one or more of the following features:

Any of the methods described above, wherein: generating a locked whitebox implementation according to the fingerprint of the run-time device and the build identifier includes: encoding the unlocked whitebox LUTs by applying run-time device specific locking transformations to the unlocked whitebox LUTs according to the fingerprint.

Any of the methods described above that further include: generating the encoded secret by applying the run-time device specific locking transformations to the secret.

Any of the methods described above, wherein the encoded secret is generated in response to the request for the secret.

Any of the methods described above, wherein the encoded secret is before the request for the secret. The method wherein the base file and list of unlocked whitebox LUTs generated by a second device executing a toolchain executing in the cloud service.

Any of the methods described above, wherein: the request to register the whitebox implementation includes build-time device credentials and which methods further include: determining if the build-time device credentials are valid; and if the build-time device credentials are not valid, refusing registration of the whitebox implementation.

Any of the methods described above, wherein: the lock request is automatically transmitted from a first address; and the method further includes: determining if a preceding node locking request having the same build identifier was received from a second address; and rejecting the lock request if the preceding node locking request the build identifier was received from the second address.

Any of the methods described above, wherein: the lock request is automatically transmitted from a first address and; the methods further include: determining if a preceding node locking request having a different build identifier was received from the first address; and rejecting the lock request if the preceding node locking request having the different build identifier was received from the first address.

Another embodiment is evidenced by a an apparatus for enabling secure generation of an output in a run-time device, including: a processor; a memory, communicatively coupled to the processor, the memory storing processor instructions including processor instructions for performing the above-described methods.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of enabling secure generation of an output in a run-time device, comprising:
    receiving a request to register a whitebox implementation for generating the output in a network service from a build-time device, the request to register comprising:
        a base file; and
        a list of unlocked whitebox look up tables (LUTs);
    registering the base file and the list of unlocked whitebox LUTs in the network service;
    returning a surrogate whitebox implementation having a build identifier (ID) and a plurality of blank LUTs to the build-time device;
    receiving a lock request from the run-time device upon execution of the surrogate whitebox implementation, the lock request comprising a fingerprint of the run-time device determined by the run-time device upon first execution of the surrogate whitebox implementation and the build identifier;
    generating a locked whitebox implementation according to the received fingerprint of the run-time device and the build identifier, the locked whitebox implementation having a plurality of run-time device specific locked whitebox LUTs;
    transmitting the plurality of run-time device specific locked whitebox LUTs from the network service to the run-time device;
    receiving a request for a secret from the run-time device, the request for the secret including the build ID; and
    transmitting an encoded secret.

2. The method of claim 1, wherein:
    generating a locked whitebox implementation according to the fingerprint of the run-time device and the build identifier comprises:
        encoding the unlocked whitebox LUTs by applying run-time device specific locking transformations to the unlocked whitebox LUTs according to the fingerprint.

3. The method of claim 2, further comprising:
    generating the encoded secret by applying the run-time device specific locking transformations to the secret.

4. The method of claim 3, wherein the encoded secret is generated in response to the request for the secret.

5. The method of claim 3, wherein the encoded secret is before the request for the secret.

6. The method of claim 1, wherein the base file and list of unlocked whitebox LUTs generated by a second device executing a toolchain executing in the network service.

7. The method of claim 1, wherein:
    the request to register the whitebox implementation comprises build-time device credentials;
    the method further comprises:
        determining if the build-time device credentials are valid; and
        if the build-time device credentials are not valid, refusing registration of the whitebox implementation.

8. The method of claim 1, wherein:
    the lock request is automatically transmitted from a first address; and
    the method further comprises:
        determining if a preceding node locking request having the same build identifier was received from a second address; and
        rejecting the lock request if the preceding node locking request the build identifier was received from the second address.

9. The method of claim 1, wherein:
    the lock request is automatically transmitted from a first address and;
    the method further comprises:
        determining if a preceding node locking request having a different build identifier was received from the first address; and
        rejecting the lock request if the preceding node locking request having the different build identifier was received from the first address.

10. An apparatus for enabling secure generation of an output in a run-time device, comprising:
    a processor;
    a memory, communicatively coupled to the processor, the memory storing processor instructions comprising processor instructions for:
        receiving a request to register a whitebox implementation for generating the output in a network service from a build-time device, the request to register comprising:

a base file; and
a list of unlocked whitebox look up tables (LUTs);
registering the base file and the list of unlocked whitebox LUTs in the network service;
returning a surrogate whitebox implementation having a build identifier (ID) and a plurality of blank LUTs to the build-time device;
receiving a lock request from the run-time device upon execution of the surrogate whitebox implementation, the lock request comprising a fingerprint of the run-time device determined by the run-time device upon first execution of the surrogate whitebox implementation and the build identifier;
generating a locked whitebox implementation according to the received fingerprint of the run-time device and the build identifier, the locked whitebox implementation having a plurality of run-time device specific locked whitebox LUTs;
transmitting the plurality of run-time device specific locked whitebox LUTs from the network service to the run-time device;
receiving a request for a secret from the run-time device, the request for the secret including the build ID; and
transmitting an encoded secret.

11. The apparatus of claim 10, wherein:
the processor instructions for generating a locked whitebox implementation according to the fingerprint of the run-time device and the build identifier comprises processor instructions for:
encoding the unlocked whitebox LUTs by applying run-time device specific locking transformations to the unlocked whitebox LUTs according to the fingerprint.

12. The apparatus of claim 11, wherein the processor instructions further comprise processor instructions for:
generating the encoded secret by applying the run-time device specific locking transformations to the secret.

13. The apparatus of claim 12, wherein the encoded secret is generated in response to the request for the secret.

14. The apparatus of claim 12, wherein the encoded secret is before the request for the secret.

15. The apparatus of claim 10, wherein the base file and list of unlocked whitebox LUTs generated by a second device executing a toolchain executing in the network service.

16. The apparatus of claim 10, wherein:
the request to register the whitebox implementation comprises build-time device credentials;
the processor instructions further comprise processor instructions for;
determining if the build-time device credentials are valid; and
if the build-time device credentials are not valid, refusing registration of the whitebox implementation.

17. The apparatus of claim 10, wherein:
the lock request is automatically transmitted from a first address; and
the processor instructions further comprise processor instructions for:
determining if a preceding node locking request having the same build identifier was received from a second address; and
rejecting the lock request if the preceding node locking request the build identifier was received from the second address.

18. The apparatus of claim 10, wherein:
the lock request is automatically transmitted from a first address;
the processor instructions further comprise processor instructions for:
determining if a preceding node locking request having a different build identifier was received from the first address; and
rejecting the lock request if the preceding node locking request having the different build identifier was received from the first address.

19. The apparatus of claim 10 wherein said network service is a cloud service.

20. The apparatus of claim 10 wherein said network service is an on-line service.

21. A method of enabling secure generation of an output in a run-time device, comprising:
receiving a request to register a network based device implementation for generating the output in a network service from a build-time device, the request to register comprising:
a base file; and
a list of unlocked network based device data tables (DTs);
registering the base file and the list of unlocked network based device DTs in the network service;
returning a surrogate network based device implementation having a build identifier (ID) and a plurality of blank DTs to the build-time device;
receiving a lock request from the run-time device upon execution of the surrogate network based device implementation, the lock request comprising a fingerprint of the run-time device determined by the run-time device upon first execution of the surrogate network based device implementation and the build identifier;
generating a locked network based device implementation according to the received fingerprint of the run-time device and the build identifier, the locked network based device implementation having a plurality of run-time device specific locked network based device LUTs;
transmitting the plurality of run-time device specific locked network based device LUTs from the network service to the run-time device;
receiving a request for a secret from the run-time device, the request for the secret including the build ID; and
transmitting an encoded secret.

* * * * *